(12) United States Patent
Weder

(10) Patent No.: US 8,968,847 B2
(45) Date of Patent: *Mar. 3, 2015

(54) FLEXIBLE PACKAGING MATERIALS AND METHODS OF MAKING AND USING SAME

(71) Applicant: Wanda M. Weder and William F. Straeter, not individually but solely as Trustees of The Family Trust, Highland, IL (US)

(72) Inventor: Donald E. Weder, Highland, IL (US)

(73) Assignee: Wanda M. Weder & William F. Straeter, Highland, IL (US), not individually but solely as Trustees of The Family Trust U/T/A dated 12/8/1995

(*) Notice: Subject to any disclaimer, the term of this patent is extended or adjusted under 35 U.S.C. 154(b) by 0 days.

This patent is subject to a terminal disclaimer.

(21) Appl. No.: 14/134,719

(22) Filed: Dec. 19, 2013

(65) Prior Publication Data

US 2014/0103011 A1    Apr. 17, 2014

Related U.S. Application Data

(63) Continuation of application No. 13/692,169, filed on Dec. 3, 2012, now Pat. No. 8,728,596, which is a continuation of application No. 13/022,760, filed on Feb. 8, 2011, now abandoned, which is a continuation (Continued)

(51) Int. Cl.
 B29D 22/00 (2006.01)
 B29D 23/00 (2006.01)
 (Continued)

(52) U.S. Cl.
 CPC B65D 9/10 (2013.01); A41G 1/009 (2013.01);

*B31D 5/0073* (2013.01); *B31D 5/0078* (2013.01); *B32B 1/02* (2013.01); *B32B 3/16* (2013.01); *B65B 55/20* (2013.01);
(Continued)

(58) Field of Classification Search
 CPC ...... B65D 81/052; B65D 23/02; B65D 81/03; B65D 81/00; B65D 81/02; B65D 9/10; B29D 22/02; B29D 22/00; B29D 23/00; B65B 23/00; B65B 23/02
 USPC ................. 428/34.1; 220/232; 206/457, 522; 217/122, 3 R; 53/472
 See application file for complete search history.

(56) References Cited

U.S. PATENT DOCUMENTS 524,219 A   8/1894  Schmidt
732,889 A   7/1903  Paver
(Continued)

FOREIGN PATENT DOCUMENTS

AU   4231978   6/1979
BE   654427    1/1965
(Continued)

OTHER PUBLICATIONS

Speed Cover Brochure, "The Simple Solution for Those Peak Volume Periods", Highland Supply Corporation, ©1989.
(Continued)

*Primary Examiner* — Michael C Miggins
(74) *Attorney, Agent, or Firm* — Dunlap Codding, P.C.

(57) ABSTRACT

Packaging materials are disclosed, along with packages formed therefrom and methods for forming the packages.

14 Claims, 10 Drawing Sheets

Related U.S. Application Data of application No. 12/577,422, filed on Oct. 12, 2009, now Pat. No. 7,906,190, which is a continuation of application No. 11/063,024, filed on Feb. 22, 2005, now abandoned, which is a continuation-in-part of application No. 10/383,413, filed on Mar. 7, 2003, now abandoned, which is a continuation-in-part of application No. 09/934,301, filed on Aug. 21, 2001, now Pat. No. 6,534,136.

(51) Int. Cl.
  *B32B 1/08* (2006.01)
  *B31B 45/00* (2006.01)
  *B65D 6/08* (2006.01)
  *A41G 1/00* (2006.01)
  *B31D 5/00* (2006.01)
  *B32B 1/02* (2006.01)
  *B32B 3/16* (2006.01)
  *B65B 55/20* (2006.01)
  *B65D 81/03* (2006.01)
  *B65D 81/05* (2006.01)
  *B65B 11/00* (2006.01)
  *B65D 65/40* (2006.01)
  *B65B 23/02* (2006.01)

(52) U.S. Cl.
  CPC ............... *B65D 81/03* (2013.01); *B65D 81/05* (2013.01); *B65D 81/051* (2013.01); *B65D 81/052* (2013.01); *B65B 11/00* (2013.01); *B65D 65/406* (2013.01); *B65B 23/02* (2013.01); *B31D 2205/0023* (2013.01); *B31D 2205/0082* (2013.01)
  USPC .......... 428/34.1; 220/232; 206/457; 206/522; 217/122; 217/3 R; 53/472

(56) References Cited

U.S. PATENT DOCUMENTS

| | | | |
|---|---|---|---|
| 950,785 | A | 3/1910 | Pene |
| 1,044,260 | A | 11/1912 | Schloss |
| 1,063,154 | A | 5/1913 | Bergen |
| 1,446,563 | A | 2/1923 | Hughes |
| 1,520,647 | A | 12/1924 | Hennigan |
| 1,525,015 | A | 2/1925 | Weeks |
| 1,610,652 | A | 12/1926 | Bouchard |
| 1,697,751 | A | 1/1929 | Blake |
| 1,794,212 | A | 1/1929 | Snyder |
| 1,811,574 | A | 3/1930 | Barrett |
| 1,863,216 | A | 6/1932 | Wordingham |
| 1,978,631 | A | 10/1934 | Herrlinger |
| 2,048,123 | A | 7/1936 | Howard |
| RE21,065 | E | 5/1939 | Copeman |
| 2,170,147 | A | 8/1939 | Lane |
| 2,200,111 | A | 5/1940 | Bensel |
| 2,278,673 | A | 4/1942 | Savada et al. |
| 2,302,259 | A | 11/1942 | Rothfuss |
| 2,323,287 | A | 7/1943 | Amberg |
| 2,355,559 | A | 8/1944 | Renner |
| 2,371,985 | A | 3/1945 | Freiberg |
| 2,411,328 | A | 11/1946 | MacNab |
| 2,510,120 | A | 6/1950 | Leander |
| 2,529,060 | A | 11/1950 | Trillich |
| 2,621,142 | A | 12/1952 | Wetherell |
| 2,648,487 | A | 8/1953 | Linda |
| 2,688,354 | A | 9/1954 | Berger |
| 2,688,914 | A | 9/1954 | Eckler |
| 2,774,187 | A | 12/1956 | Smithers |
| 2,822,287 | A | 2/1958 | Avery |
| 2,846,060 | A | 8/1958 | Yount |
| 2,850,842 | A | 9/1958 | Eubank, Jr. |
| 2,883,262 | A | 4/1959 | Borin |
| 2,989,828 | A | 6/1961 | Warp |
| 3,003,681 | A | 10/1961 | Orsini |
| 3,022,605 | A | 2/1962 | Reynolds |
| 3,080,680 | A | 3/1963 | Reynolds et al. |
| 3,094,810 | A | 6/1963 | Kalpin |
| 3,121,647 | A | 2/1964 | Harris et al. |
| 3,130,113 | A | 4/1964 | Silman |
| 3,166,799 | A | 1/1965 | Birnkrant |
| 3,172,796 | A | 3/1965 | Gülker |
| 3,271,922 | A | 9/1966 | Wallerstein et al. |
| 3,293,100 | A | 12/1966 | Questel |
| 3,316,675 | A | 5/1967 | Cartwright, Jr. |
| 3,322,325 | A | 5/1967 | Bush |
| 3,357,152 | A | 12/1967 | Geigel |
| 3,376,666 | A | 4/1968 | Leonard |
| 3,380,646 | A | 4/1968 | Doyen et al. |
| 3,405,863 | A | 10/1968 | Kugler |
| 3,431,706 | A | 3/1969 | Stuck |
| 3,508,372 | A | 4/1970 | Wallerstein et al. |
| 3,510,054 | A | 5/1970 | Sanni et al. |
| 3,512,700 | A | 5/1970 | Evans et al. |
| 3,550,318 | A | 12/1970 | Remke et al. |
| 3,552,059 | A | 1/1971 | Moore |
| 3,554,434 | A | 1/1971 | Anderson |
| 3,556,389 | A | 1/1971 | Gregoire |
| 3,557,516 | A | 1/1971 | Brandt |
| 3,620,366 | A | 11/1971 | Parkinson |
| 3,681,105 | A | 8/1972 | Milutin et al. |
| 3,767,104 | A | 10/1973 | Bachman et al. |
| 3,793,799 | A | 2/1974 | Howe et al. |
| 3,804,322 | A | 4/1974 | Ericson |
| 3,869,828 | A | 3/1975 | Matsumoto |
| 3,888,443 | A | 6/1975 | Flanigen |
| 3,962,503 | A | 6/1976 | Crawford |
| 4,043,077 | A | 8/1977 | Stonehocker |
| 4,054,697 | A | 10/1977 | Reed et al. |
| 4,091,925 | A | 5/1978 | Griffo et al. |
| 4,113,100 | A | 9/1978 | Soja et al. |
| 4,118,890 | A | 10/1978 | Shore |
| 4,149,339 | A | 4/1979 | Hall et al. |
| 4,170,618 | A | 10/1979 | Adams |
| 4,189,868 | A | 2/1980 | Tymchuck et al. |
| 4,216,620 | A | 8/1980 | Weder et al. |
| 4,248,347 | A | 2/1981 | Trimbee |
| D259,333 | S | 5/1981 | Charbonneau |
| 4,265,049 | A | 5/1981 | Gorewitz |
| 4,280,314 | A | 7/1981 | Stuck |
| 4,297,811 | A | 11/1981 | Weder |
| 4,333,267 | A | 6/1982 | Witte |
| 4,347,686 | A | 9/1982 | Wood |
| 4,380,564 | A | 4/1983 | Cancio et al. |
| 4,400,910 | A | 8/1983 | Koudstall et al. |
| 4,413,725 | A | 11/1983 | Bruno et al. |
| 4,508,223 | A | 4/1985 | Catrambone |
| D279,279 | S | 6/1985 | Wagner |
| 4,546,875 | A | 10/1985 | Zweber |
| 4,621,733 | A | 11/1986 | Harris |
| 4,640,079 | A | 2/1987 | Stuck |
| 4,674,972 | A | 6/1987 | Wagner |
| 4,692,111 | A | 9/1987 | Wagner |
| 4,717,262 | A | 1/1988 | Roen et al. |
| 4,733,521 | A | 3/1988 | Weder et al. |
| 4,765,464 | A | 8/1988 | Ristvedt |
| 4,771,573 | A | 9/1988 | Stengel |
| 4,773,182 | A | 9/1988 | Weder et al. |
| 4,801,014 | A | 1/1989 | Meadows |
| 4,810,109 | A | 3/1989 | Castel |
| 4,835,834 | A | 6/1989 | Weder |
| D301,991 | S | 7/1989 | Van Sant |
| D304,317 | S | 10/1989 | Wagner |
| 4,900,390 | A | 2/1990 | Colten et al. |
| 4,941,572 | A | 7/1990 | Harris |
| 4,946,290 | A | 8/1990 | Matyja |
| 4,980,209 | A | 12/1990 | Hill |
| 4,989,396 | A | 2/1991 | Weder et al. |
| D315,700 | S | 3/1991 | Stephens |
| 5,073,161 | A | 12/1991 | Weder et al. |
| 5,074,675 | A | 12/1991 | Osgood |
| 5,076,011 | A | 12/1991 | Stehouwer |

(56) References Cited

U.S. PATENT DOCUMENTS

| | | |
|---|---|---|
| 5,102,034 A | 4/1992 | Amabili |
| 5,105,599 A | 4/1992 | Weder |
| 5,111,638 A | 5/1992 | Weder |
| 5,117,584 A | 6/1992 | Ottenwalder |
| 5,120,382 A | 6/1992 | Weder |
| 5,152,100 A | 10/1992 | Weder et al. |
| 5,181,364 A | 1/1993 | Weder |
| D335,105 S | 4/1993 | Ottenwalder et al. |
| 5,199,242 A | 4/1993 | Weder et al. |
| 5,205,108 A | 4/1993 | Weder et al. |
| 5,228,234 A | 7/1993 | de Klerk et al. |
| 5,235,782 A | 8/1993 | Landau |
| 5,239,775 A | 8/1993 | Landau |
| 5,249,407 A | 10/1993 | Stuck |
| 5,259,106 A | 11/1993 | Weder et al. |
| 5,307,606 A | 5/1994 | Weder |
| 5,315,785 A | 5/1994 | Avôt et al. |
| 5,350,240 A | 9/1994 | Billman et al. |
| 5,353,575 A | 10/1994 | Stepanek |
| 5,361,482 A | 11/1994 | Weder et al. |
| 5,388,695 A | 2/1995 | Gilbert |
| 5,428,939 A | 7/1995 | Weder et al. |
| 5,443,670 A | 8/1995 | Landau |
| D362,829 S | 10/1995 | Wagner |
| 5,493,809 A | 2/1996 | Weder et al. |
| D368,025 S | 3/1996 | Sekerak et al. |
| 5,496,251 A | 3/1996 | Cheng |
| 5,496,252 A | 3/1996 | Gilbert |
| 5,526,932 A | 6/1996 | Weder |
| 5,551,570 A | 9/1996 | Shaffer et al. |
| 5,572,849 A | 11/1996 | Weder et al. |
| 5,572,851 A | 11/1996 | Weder |
| 5,575,107 A | 11/1996 | Doerr |
| 5,575,133 A | 11/1996 | Weder et al. |
| 5,617,703 A | 4/1997 | Weder |
| 5,624,320 A | 4/1997 | Martinez |
| 5,625,979 A | 5/1997 | Weder |
| 5,647,168 A | 7/1997 | Gilbert |
| 5,647,193 A | 7/1997 | Weder et al. |
| 5,706,605 A | 1/1998 | Alzacar |
| 5,715,944 A | 2/1998 | Windisch |
| 5,735,103 A | 4/1998 | Weder |
| 5,758,472 A | 6/1998 | Weder |
| 5,813,194 A | 9/1998 | Weder |
| D399,787 S | 10/1998 | Wagner |
| D399,788 S | 10/1998 | Wagner |
| 5,823,840 A | 10/1998 | Powers |
| D404,684 S | 1/1999 | Shea |
| 5,891,286 A | 4/1999 | Weder |
| D409,057 S | 5/1999 | Wagner |
| 5,924,241 A | 7/1999 | Hodge |
| 5,941,020 A | 8/1999 | Weder |
| D413,547 S | 9/1999 | Wagner |
| 5,966,866 A | 10/1999 | Ferguson |
| 5,974,730 A | 11/1999 | Chien |
| 5,985,380 A | 11/1999 | Weder |
| 5,992,637 A | 11/1999 | Weder |
| D419,436 S | 1/2000 | Celtorius et al. |
| 6,009,687 A | 1/2000 | Weder |
| 6,047,524 A | 4/2000 | Weder |
| D424,972 S | 5/2000 | Ferguson |
| 6,065,601 A | 5/2000 | Weder |
| 6,071,445 A | 6/2000 | Wagner |
| D428,827 S | 8/2000 | Wagner |
| 6,098,336 A | 8/2000 | Ferguson |
| D431,495 S | 10/2000 | Wagner |
| 6,129,208 A | 10/2000 | Ferguson |
| 6,129,209 A | 10/2000 | Tchira |
| 6,141,906 A | 11/2000 | Weder |
| D435,481 S | 12/2000 | Wagner |
| 6,182,395 B1 | 2/2001 | Weder |
| 6,183,590 B1 | 2/2001 | Weder |
| D448,130 S | 9/2001 | Wagner |
| 6,286,255 B1 | 9/2001 | Weder et al. |
| 6,286,256 B1 | 9/2001 | Weder |
| 6,345,467 B1 | 2/2002 | Weder |
| 6,534,136 B2 | 3/2003 | Weder |
| 6,740,274 B2 * | 5/2004 | Weder et al. ............. 264/132 |
| 7,906,190 B2 | 3/2011 | Weder |
| 2002/0078506 A1 | 6/2002 | Sloot |
| 2002/0112401 A1 | 8/2002 | Weder et al. |

FOREIGN PATENT DOCUMENTS

| | | |
|---|---|---|
| CH | 560532 | 4/1975 |
| DE | 15550 | 6/1900 |
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3911847 | 10/1990 |
| DK | 1204647 | 9/1970 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2332144 | 7/1977 |
| FR | 2489126 | 3/1982 |
| FR | 2567068 | 7/1984 |
| FR | 2610604 | 8/1988 |
| FR | 2603159 | 3/1989 |
| FR | 2619698 | 3/1989 |
| GB | 5605 | 0/1885 |
| GB | 2056410 | 3/1981 |
| GB | 2074542 | 11/1981 |
| GB | 2100357 | 12/1982 |
| GB | 2128083 | 4/1984 |
| GB | 2203127 | 10/1988 |
| GB | 2212136 | 7/1989 |
| GB | 2252708 | 8/1992 |
| IT | 224507 | 4/1996 |
| JP | 542958 | 2/1993 |
| JP | 6127555 | 5/1994 |
| JP | 8-19334 | 1/1996 |
| NL | 8301709 | 12/1984 |
| NL | 1000658 | 1/1996 |
| WO | 9315979 | 8/1993 |
| WO | 9712819 | 4/1997 |

OTHER PUBLICATIONS

"Speed Sheets and Speed Rolls" Brochure, Highland Supply Corporation, ©1990.
"Color Them Happy with Highlander Products" ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.
"Stand Alone Plastic Bagmaking" brochure, AMI, Atlanta, GA, Feb. 15, 1996, 2 pages.
"Foil Jackets" brochure, Custom Medallion, Inc., Dec. 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

(56) References Cited

OTHER PUBLICATIONS

"Special Occasion Printed Highlophane Bags" Brochure, Highland Supply Corporation, 1990, 2 pages.
"Creative Packaging" Brochure, John Henry Company, Sep. 1992.
"Make Highlander Your Headquarters" Brochure, Highland Supply Corporation, 1991.
U.S. Appl. No. 10/383,413, filed Mar. 7, 2003; Office Action, dated Aug. 25, 2004.
U.S. Appl. No. 10/383,413, filed Mar. 7, 2003; Office Action, dated Jun. 8, 2005.
U.S. Appl. No. 10/383,413, filed Mar. 7, 2003; Office Action, dated Apr. 14, 2006.
U.S. Appl. No. 10/383,413, filed Mar. 7, 2003; Office Action, dated Oct. 12, 2006.
U.S. Appl. No. 10/383,413, filed Mar. 7, 2003; Office Action, dated Jun. 26, 2007.
U.S. Appl. No. 10/383,413, filed Mar. 7, 2003; Final Office Action, dated Mar. 31, 2008.
U.S. Appl. No. 11/063,024, filed Feb. 22, 2005; Office Action, dated Jan. 9, 2008.
U.S. Appl. No. 11/063,024, filed Feb. 22, 2005; Office Action, dated Oct. 6, 2008.
U.S. Appl. No. 11/063,024, filed Feb. 22, 2005; Final Office Action, dated Jul. 10, 2009.
U.S. Appl. No. 12/577,422, filed Oct. 12, 2009; Office Action, dated Apr. 29, 2010.
U.S. Appl. No. 12/577,422, filed Oct. 12, 2009; Notice of Allowance, dated Nov. 15, 2010.
U.S. Appl. No. 11/283,008, filed Nov. 18, 2005; Office Action, dated Mar. 25, 2008.
U.S. Appl. No. 11/283,008, filed Nov. 18, 2005; Office Action, dated Dec. 1, 2008.
U.S. Appl. No. 11/283,008, filed Nov. 18, 2005; Final Office Action, dated Aug. 18, 2009.
U.S. Appl. No. 12/634,086, filed Dec. 9, 2009; Office Action, dated Jul. 21, 2010.
U.S. Appl. No. 13/011,325, filed Jan. 21, 2011; Office Action, dated Dec. 8, 2011.
U.S. Appl. No. 13/011,325, filed Jan. 21, 2011; Final Office Action, dated Jul. 5, 2012.
U.S. Appl. No. 13/022,760, filed Feb. 8, 2011; Office Action, dated Jan. 19, 2012.
U.S. Appl. No. 13/022,760, filed Feb. 8, 2011; Office Action, dated May 23, 2012.

* cited by examiner

FLEXIBLE PACKAGING MATERIALS AND METHODS OF MAKING AND USING SAME

CROSS REFERENCE TO RELATED APPLICATIONS/INCORPORATION BY REFERENCE STATEMENT

This application is a continuation of U.S. Ser. No. 13/692,169, filed Dec. 3, 2012; which is a continuation of U.S. Ser. No. 13/022,760, filed Feb. 8, 2011, now abandoned; which is a continuation of U.S. Ser. No. 12/577,422, filed Oct. 12, 2009, now U.S. Pat. No. 7,906,190, issued Mar. 15, 2011; which is a continuation of U.S. Ser. No. 11/063,024, filed Feb. 22, 2005, now abandoned; which is a continuation-in-part of U.S. Ser. No. 10/383,413, filed on Mar. 7, 2003, now abandoned; which is a continuation-in-part of U.S. Ser. No. 09/934,301, filed Aug. 21, 2001, now U.S. Pat. No. 6,534,136. The entire contents of each of the above-referenced patents and patent applications are expressly incorporated herein by reference.

BACKGROUND

In the process of shipping an article from one location to another, the article is typically placed in a container along with a protective packaging material to fill the voids about the article and to cushion the article during the shipping process. One common protective packaging material includes a plurality of plastic foam, peanut-shaped members which are commonly known as "Styrofoam peanuts". An advantage in using Styrofoam peanuts is the ease with which they may be disposed about an article positioned in a container by simply pouring the Styrofoam peanuts from a dispenser.

While Styrofoam peanuts have been widely accepted in the packaging industry, they are not without disadvantages. For example, their light weight and flowability results in heavier objects gravitating through the peanuts to the bottom of the container where the heavier objects can be damaged. Also, while the flowability of the Styrofoam peanuts facilitates the introduction of the peanuts into a container, the receiver of the package is left with having to deal with cleaning up the mess left by the peanuts which are easily scattered upon removal of the article from the container.

These and other disadvantages associated with the disposal of Styrofoam peanuts, have made paper protective packaging material a popular alternative. Paper is biodegradable, recyclable, and renewable therefore making it an environmentally responsible choice. However, like Styrofoam peanuts, paper packaging materials are not without disadvantages. Paper, particularly shredded paper, can be inconvenient to clean up and to dispose of due to the lack of cohesiveness of the packaging material. Due to the lack of resiliency in paper products, large amounts of paper are typically required to provide the bulk needed to adequately cushion an object.

Strips of sheet material formed into tufts have also been used for many years as a packaging material. More specifically, material known as decorative grass has been used in fruit baskets, Easter baskets, picnic baskets, and for other packaging and decorative purposes. The decorative grass of the prior art has been produced by numerous methods and from a variety of materials such as polymeric materials, paper, cellophane or the like. Typically, such materials are cut and shredded to produce segments having predetermined dimensions. As such, decorative grass, like Styrofoam peanuts and paper materials described above, can be inconvenient to clean up. Furthermore, the decorative grass can compress and lose its cushioning ability. Large amounts of decorative grass are necessary, therefore, in order to overcome such compression and/or compaction deficiencies.

To this end, a packaging material is needed that includes or mimics a plurality of resilient individual strips, strands, or units of material intertwined with one another or other organic or inorganic materials that may be bondably connected to a flexible substrate or substratum so as to form a unitary cushioning unit which overcomes the above-mentioned disadvantages of prior art packaging materials and has the added benefit of providing a decorative border. It is to such a packaging material that the presently disclosed and claimed inventive concept(s) is directed.

DETAILED DESCRIPTION

Figure 1:
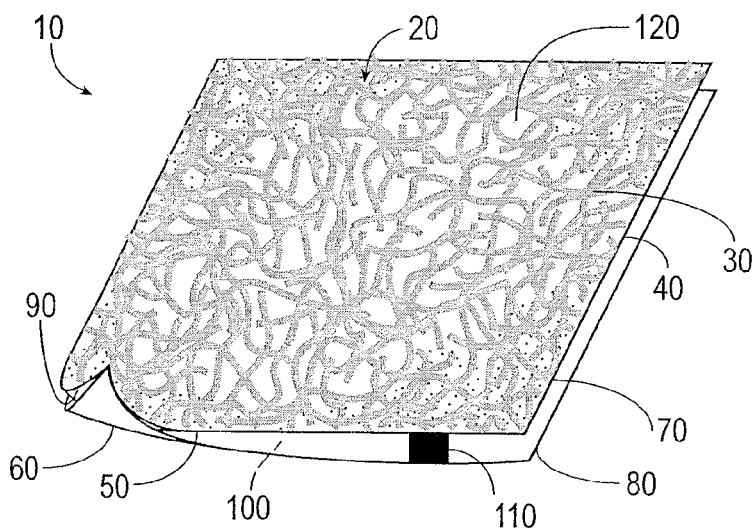
FIG. 1 is a perspective view of an inflatable packaging material (in a deflated condition) constructed in accordance with the presently disclosed and claimed inventive concept(s), one edge of the uninflatable packaging material being upwardly turned for illustration purposed only.

Before explaining the various embodiments of the presently disclosed and claimed inventive concept(s) in detail, it is to be understood that the presently disclosed and claimed inventive concept(s) is not limited in its application to the details of construction and the arrangement of the components set forth in the following description or illustrated in the drawings. The presently disclosed and claimed inventive concept(s) is capable of other embodiments or of being practiced or carried out in various ways and as such all such embodiments and/or equivalents are to be considered as being encompassed within the scope and description of the presently disclosed and claimed inventive concept(s). Also, it is to be understood that the phraseology and terminology employed herein is for purpose of description and should not be regarded as limiting.

The presently disclosed and claimed inventive concept(s) relates, generally, to packaging material for use in filling boxes, baskets, and in any container used to protect, store, and/or ship articles or objects. In one embodiment, the packaging material includes an inflatable flexible substrate having a decorative border and a mass of individual, thin, flexible strips, strands, or units of material intertwined with one another to form a cohesive, resilient tuft. The mass of individual strips, strands, or units of material may also be attached to one another as well as being disposed on the exterior surface of the inflatable flexible substrate. In an alternate embodiment the inflatable flexible substrate is exchanged or replaced by a cushioning substratum.

The packaging material formed according to the methods disclosed herein may be incorporated into a package which additionally includes a container, such as a box or basket, and an object positioned within the container and on top of the packaging material. The packaging material is arranged in the container to support the object when the object is disposed in the container. The packaging material may be caused to bond to the container and the object may be caused to bond to the packaging material. In use, the packaging material is disposed so as to take up excess room in the container and protect and/or cushion the object.

The objects, features and advantages of the presently disclosed and claimed inventive concept(s) will become apparent from the following detailed description when read in conjunction with the accompanying drawings and appended claims.

Figure 2:
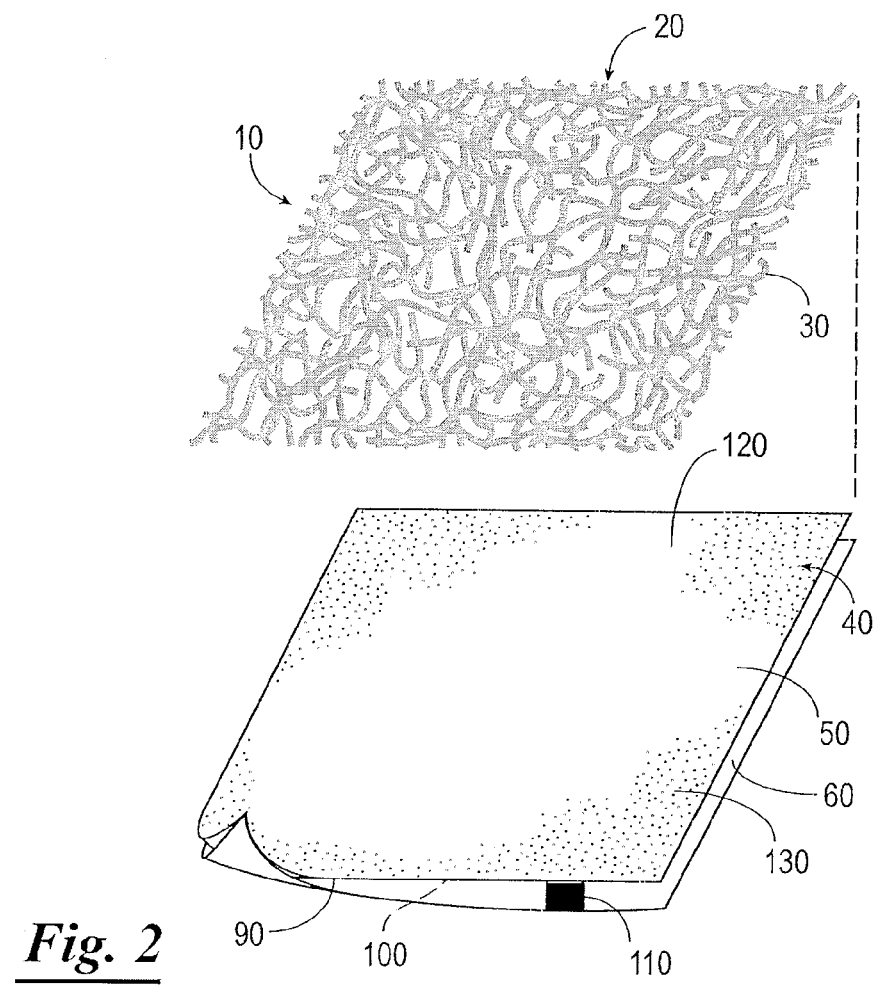
FIG. 2 is an exploded view of the inflatable packaging material of FIG. 1.
Figure 3:
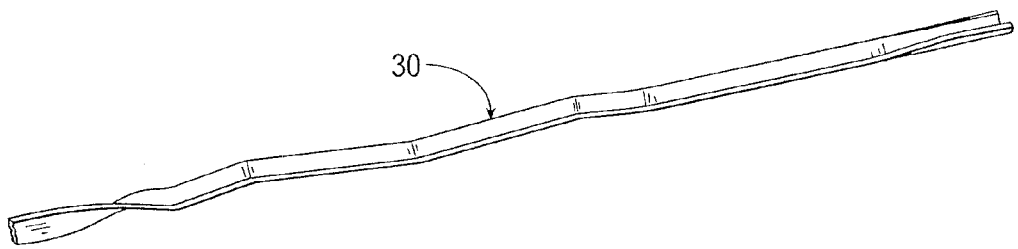
FIG. 3 is a perspective view of a strip, strand, or unit of material used to form a tuft of the inflatable packaging material constructed in accordance with the presently disclosed and claimed inventive concept(s).

Referring now to the drawings, and more specifically to FIGS. 1-3, an inflatable packaging material 10 constructed in accordance with the presently disclosed and claimed inventive concept(s) is illustrated in FIG. 1. The inflatable packaging material 10 includes a tuft 20 comprised of a plurality of individual strips, strands, or units of material 30 (FIG. 3) bondably connected to a flexible inflatable substrate 40.

The plurality of individual strips, strands, or units of material 30 can be fabricated from any flexible sheet of material including but not limited to: paper, crepe paper, polymeric film, laminated polymeric film, and waxed paper, for example. In one embodiment of the presently disclosed and claimed inventive concept(s) the laminated polymeric film for example but not by way of limitation can be at least one clear layer of polymeric film laminated to at least one iridescent layer of polymeric film so as to provide an iridescent effect to the laminated polymeric film. The flexible sheet of material from which the plurality of individual strips, strands, or units of material 30 are fabricated may have printed matter and/or one or more embossed patterns on at least one side thereof, and the one or more embossed patterns may be either in register or out of register with the printed pattern.

The plurality of individual strips, strands, or units of material 30 may also be organic or inorganic materials, including leaves, tree bark, branches, dirt, sand, sea shells, or any other type of organic or inorganic material that is capable of being bondably connected to the flexible inflatable substrate 40 to provide a decorative and/or cushioning effect. Furthermore, when the plurality of individual strips, strands, or units of material 30 are fabricated from a flexible sheet of material, additional inorganic and/or organic materials may be attached onto or be incorporated into or within the flexible sheet of material prior to or after its being used to fabricate the plurality of individual strips, strands, or units of material 30.

The printed pattern on the flexible sheet of material from which the plurality of individual strips, strands, or units of material 30 are fabricated can be printed in a conventional matter so that, when the sheet of material is slit and cut to produce the strips, strands, or units of material 30, at least a substantial portion of the strips, strands, or units of material 30 contain at least a portion of the printed pattern. Further, different colors can be employed to provide the printed pattern on the sheet of material from which the plurality of individual strips, strands, or units of material 30 is fabricated.

The sheet of material can also have one or more embossed patterns to provide the sheet of material with an embossed pattern. Further, the sheet of material can be provided with an embossed pattern as well as a printed pattern, and the embossed pattern can be either in register or out of register with the printed material and/or printed design.

The plurality of individual strips, strands, or units of material 30, as described above, in one embodiment are commonly referred to as strands, or units of "Easter grass" or "decorative grass", and such, decorative grass has been used for many years for filling fruit baskets, Easter baskets, and picnic baskets and for other decorative and packaging purposes. The decorative grass of the prior art has been produced by numerous methods and from a variety of materials, such as those listed above. Typically, such materials are shredded and cut to produce segmented strips having predetermined dimensions. While the prior art methods for making decorative grass have been widely accepted, new techniques for facilitating the use of decorative grass as a packaging material have been sought in view of the fact that decorative grass and other loose shredded packaging material readily fall onto the floor, cling to various objects making them awkward and inconvenient to clean up, and compact and thereby no longer adequately cushion and/or protect the items placed thereon.

By connecting the tuft 20 (composed of a plurality of the strips, strands, or units of material 30) to the flexible inflatable substrate 40, the clean up problems associated with loose fill materials are alleviated and, because the flexible inflatable substrate 40 is capable of being inflated, the compacting problems with loose fill are also alleviated and lesser amounts of material are required. The flexible inflatable substrate 40 can also be caused to adhere or cohere to an object and/or the container in which it is placed thereby resulting in an enhanced packaging effect. That is, with loose packaging materials, the object being packaged has a tendency to gravitate through the packaging material to the bottom of the container thereby reducing the effectiveness of the packaging material. By using the inflatable packaging material 10 disclosed herein, the cohesiveness of the inflatable packaging material 10 surrounding the object prevents the object from gravitating through the container and coming to rest in the bottom of the container.

As best shown in FIG. 2, the flexible inflatable substrate 40, in one embodiment, is fabricated of a first sheet of material 50 and a second sheet of material 60. It will be appreciated that the dimensions of the flexible inflatable substrate 40 may be further varied and the shape of the flexible inflatable substrate 40 may also, therefore, be variable—e.g., a circle, square, triangle, heart, an animal shape, a floral shape, etc. The flexible inflatable substrate 40 can be any flexible sheet of material, such as paper, crepe paper, wax paper, polymeric film, laminated polymeric film, fabric, cellulose, and foil. The flexible inflatable substrate 40 may have printed matter and/or one or more embossed patterns on at least one side thereof, and the one or more embossed patterns can be either in register or out of register with the printed pattern. Different colors can be employed to provide the printed pattern on the flexible inflatable substrate 40. For example, the printed pattern may be a pictorial representation or color or shape of the plurality of individual strips, strands, or units of material 30 such that when a small amount of the plurality of individual strips, strands, or units of material 30, forming the tuft 20 are bonded to the flexible inflatable substrate 40, the printed pattern fills in the voids between the plurality of individual strips, strands, or units of material 30 such that it appears that there are few or no actual voids of the plurality of individual strips, strands, or units of material 30 on the flexible inflatable substrate 40 thereby resulting in an aesthetically pleasing inflatable packaging material 10 that appears to be fully covered with the individual strips, strands, or units of material 30.

The first sheet of material 50 and the second sheet of material 60 of the flexible inflatable substrate 40 may be constructed of a single layer of material or a plurality of layers of the same or different types of materials. In addition, any thickness of the first sheet of material 50 and the second sheet of material 60 of the flexible inflatable substrate 40 may be utilized with the presently disclosed and claimed inventive concept(s). The first sheet of material 50 has an outer peripheral edge 70 and the second sheet of material 60 has an outer peripheral edge 80. The outer peripheral edge 70 of the first sheet of material 50 is bonded via a bonding material 90 to the outer peripheral edge 80 of the second sheet of material 60 to provide and define an expandable interior inflation space 100. A means 110 for inflating the flexible inflatable substrate 40 is placed within the expandable interior inflation space 100.

The means 110 for inflating the flexible inflatable substrate 40 may be any composition or assembly capable of inflating the expandable interior inflation space 100 to provide and place the inflatable packaging material 10 in its inflated configuration. For example, the means 110 for inflating the flexible inflatable substrate 40 may be associated with an exterior surface 120 of the flexible inflatable substrate 40 and be in fluid communication with the expandable interior inflation space 100—e.g., a tube capable of being sealed off after air and/or other gases and/or liquids are passed into the expandable interior inflation space 100.

In an alternative embodiment the means 110 for inflating the expandable interior inflation space 100 is an exothermic reaction assembly wherein, when the exothermic reaction assembly is activated, an exothermic reaction takes place thereby producing a gas capable of filling at least a portion of the expandable interior inflation space 100 of the flexible inflatable substrate 40. The exothermic reaction assembly may further include at least two chambers wherein at least one other chamber contains a weak basic composition and at least one chamber contains a weak acid composition that, when brought into reactive contact with one another (e.g., breaking each open to intermix the weak acid composition with the weak basic composition), react and form a gaseous reaction product that substantially fills the expandable interior inflation space 100 of the flexible inflatable substrate 40. The weak basic composition may in one embodiment include a Group I or Group II element. For example, the weak basic composition may be selected from the group consisting of sodium carbonate, calcium carbonate, and combinations thereof. The weak acid may be vinegar. Although certain compositions have been set forth as being included in the exothermic reaction assembly, any combination of compositions that, when placed in reactive contact with one another, produce a gaseous reaction that substantially fills the expandable interior inflation space 100 of the flexible inflatable substrate 40 are considered for use.

Although the flexible inflatable substrate 40 is shown in FIGS. 1-2 as being square, the flexible inflatable substrate 40 may be any shape. For example, the flexible inflatable substrate 40 may be square, rectangular, circular or any other geometric or fanciful shape. The shape of the flexible inflatable substrate 40 may even have an irregular, capricious or decorative shape.

To receive the tuft 20, the exterior surface 120 of the flexible inflatable substrate 40 is coated with a bonding material 130 (which may be the same as the bonding material 90) such as an adhesive or cohesive whereby the tuft 20 is caused to bond to the exterior surface 120 of the flexible inflatable substrate 40 as illustrated in FIG. 1. As shown in FIG. 2, the bonding material 130 is disposed on the entire exterior surface 120 of the flexible inflatable substrate 40—i.e., on each of the first sheet of material 50 and the second sheet of material 60. Alternatively, the bonding material 130 may be applied in such a manner as to substantially coat only one of the first sheet of material 50 or the second sheet of material 60 of the flexible inflatable substrate 40. It will be further appreciated that the bonding material 130 may be disposed on the first sheet of material 50 and/or the second sheet of material 60 in any of a variety of patterns such as strips, circles, dots or any other geometric or biomorphic shape, including decorative designs, so long as the bonding material 130 is positioned to function in accordance with the presently disclosed and claimed inventive concept(s).

The term "bonding material" as used herein can mean an adhesive, frequently a pressure sensitive adhesive, or a cohesive or any adhesive/cohesive combination, having adhesive qualities (i.e., qualities of adhesion or adhesion/cohesion, respectively) sufficient to effect the connection between portions of the tuft 20 brought into engagement with the flexible inflatable substrate 40. It will be appreciated that both adhesives and cohesives suitable for the purposes described herein are well known in the art, and both are commercially available.

Figure 4:
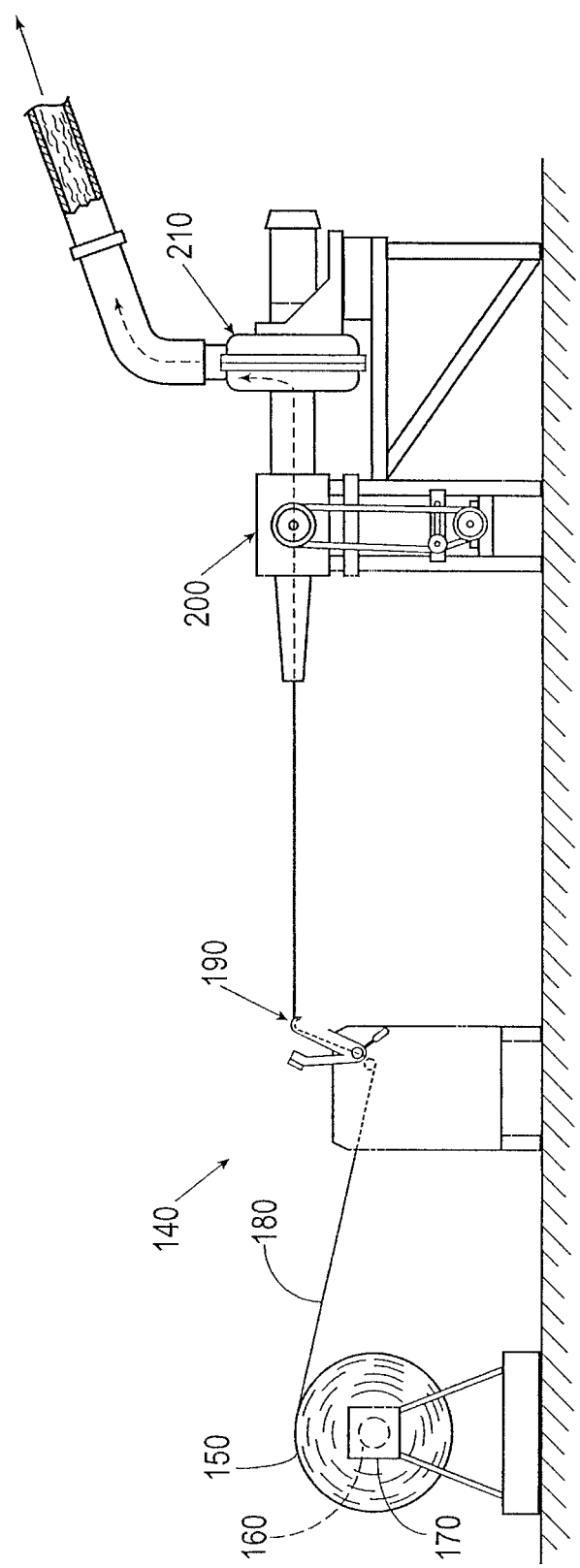
FIG. 4 is a schematic representation of a system for making the strip, strand, or unit of material of FIG. 3.

FIG. 4 schematically illustrates a system 140 for making the individual strips, strands, or units of material 30 in accordance with the presently disclosed and claimed inventive concept(s). The system 140 includes a roll of material 150 supported on a shaft 160 having a brake assembly 170 operably connected thereto for controlling the rate of withdrawal of the roll of material 150.

The roll of material 150 provides a web of sheet material 180 which is passed through a slitter 190. The slitter 190 includes a plurality of spaced apart, stationary knives or other conventional cutting mechanism, which slit or cut the web of sheet material 180 into the individual strips, strands, or units of material 30 of into a desired width.

The slitted web of sheet material 180 is thereafter passed into a cutter 200 where the slitted web of sheet material 180 is cut into predetermined lengths so as to form the individual strips, strands, or units of material 30. From the cutter 200, the individual strips, strands, or units of material 30 are conveyed by a conveyor unit 210, which is in the form of a centrifugal blower, to a storage area (not shown) which may be in the form of a suitable bin, packaging machine, or the like.

As an alternative to forming the individual strips, strands, or units of material 30 from the roll of material 150, it will be appreciated that the individual strips, strands, or units of material 30 may be formed from a polymeric film discharged from a film extrusion die which is then chilled prior to the slitting process. Such a method is disclosed in U.S. Pat. No. 4,292,266, entitled "Process for Making Decorative Grass", issued to Weder et al. on Sep. 29, 1981, which is hereby expressly incorporated herein in its entirety by reference.

As illustrated in FIG. 3, the individual strips, strands, or units of material 30 tend to curl and form folds during the forming process. It will be appreciated that these curls and folds contribute to the resiliency and bulkiness or fluffiness of the tuft 20 produced by amassing and intertwining a plurality of the individual strips, strands, or units of material 30. It will be further appreciated that the degree to which the individual strips, strands, or units of material 30 are curled and folded can vary dependant on several factors, such as the type of material used to form the individual strips, strands, or units of material 30.

Figure 2A:
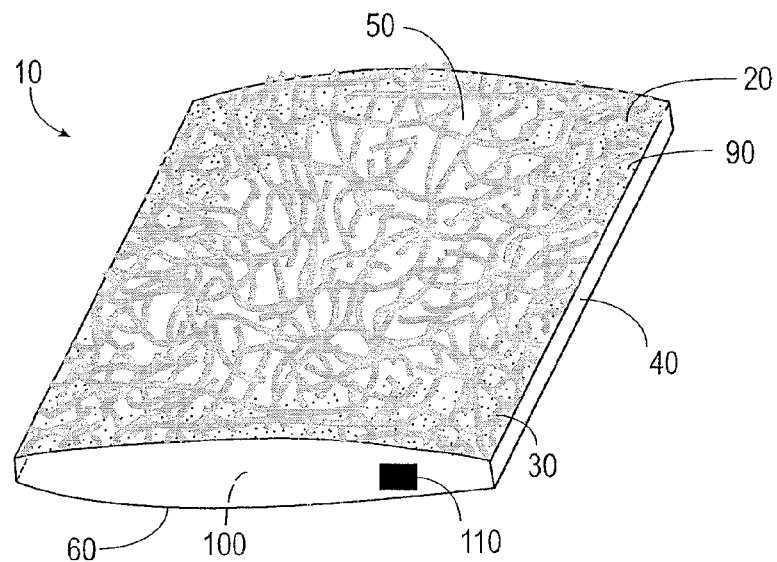
FIG. 2A is a perspective view of the inflatable packaging material of FIG. 1 in an inflated condition.

To assemble the inflatable packaging material 10, the individual strips, strands, or units of material 30 are amassed and intertwined to form the tuft 20 and then the tuft 20 is bondably connected to the flexible inflatable substrate 40 (FIG. 2). Thereafter, and as shown in FIG. 2A, the means 110 for inflating is activated such that the expandable interior inflation space 100 is inflated and the inflatable packaging material 10 is provided.

Figure 5:
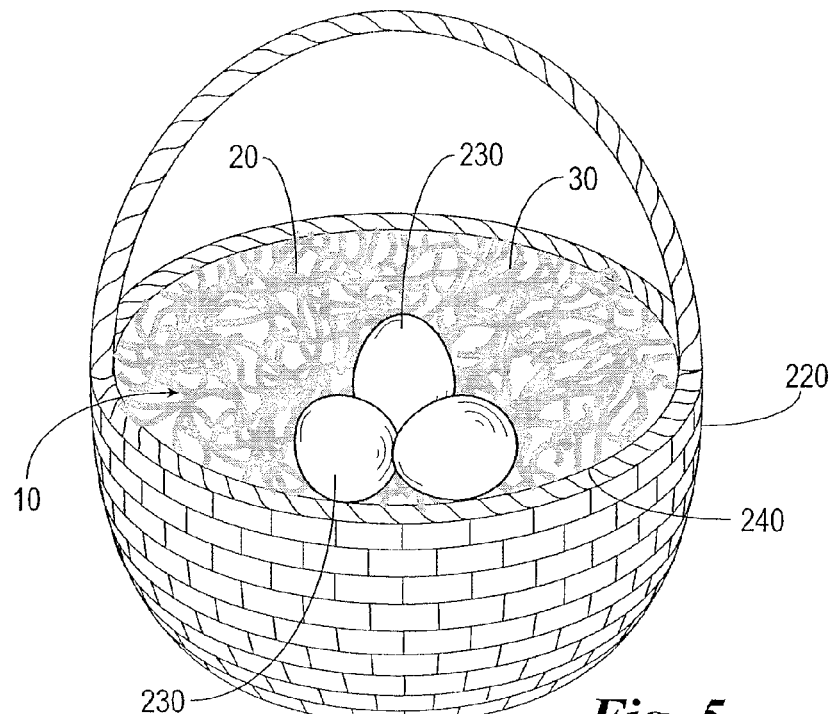
FIG. 5 is a perspective view of a basket having the inflatable packaging material disposed therein with a plurality of eggs displayed or cushioned thereon.

FIG. 5 illustrates one use of the inflatable packaging material 10 described above. The inflatable packaging material 10 is shown in its inflated configuration after the means 110 for inflating has been activated (i.e., the expandable interior inflation space 100 is inflated) and is disposed in a basket 220 to support a plurality of articles or objects 230, such as candies or Easter eggs, for display. More specifically, the inflatable packaging material 10 is positioned in an interior 240 of the basket 220 such that the flexible inflatable substrate 40 substantially conforms to the contour of the interior 240 of the basket 220 thereby lining the interior 240 of the basket 220 with the individual strips, strands, or units of material 30 forming the tuft 20 that is bonded to the flexible inflatable substrate 40 to form the inflatable packaging material 10. If the second sheet of material 60 of the flexible inflatable substrate 40 is provided with the bonding material 22, the second sheet of material 60 of the flexible inflatable substrate 40 can be bondably connected to the interior 240 of the basket 220. In addition, the bonding material 22 on the second sheet of material 60 of the flexible inflatable substrate 40 causes the inflatable packaging material 10 to remain in place in the basket 220. If the second sheet of material 60 of the flexible inflatable substrate 40 is not provided with the bonding material 22, the flexible inflatable substrate 40 simply rests in the interior 240 of the basket 220.

Figure 6:
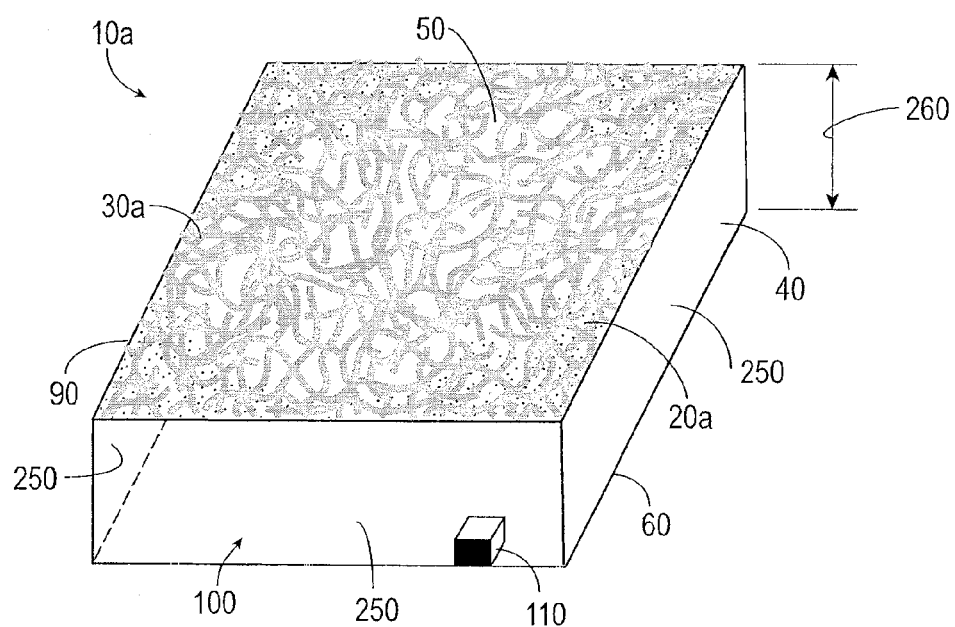
FIG. 6 is a perspective view of another embodiment of the inflatable packaging material in an inflated condition constructed in accordance with the presently disclosed and claimed inventive concept(s).

FIG. 6 illustrates a modified inflatable packaging material 10a which is similar in construction to the inflatable packaging material 10 illustrated in FIG. 1 with the exception that the inflatable packaging material 10a has elongated sidewalls 250 that upon activating the means 110 for inflating the expandable interior inflation space 100 provide the inflatable packaging material 10a with a height 260. A tuft 20a similar to the tuft 20 may be connected to the first sheet of material 50 and/or the second sheet of material 60 and/or the elongated sidewalls 250. It will be appreciated that such a configuration will facilitate insertion of the inflatable packaging material 10a into a tall square container.

Figure 7:
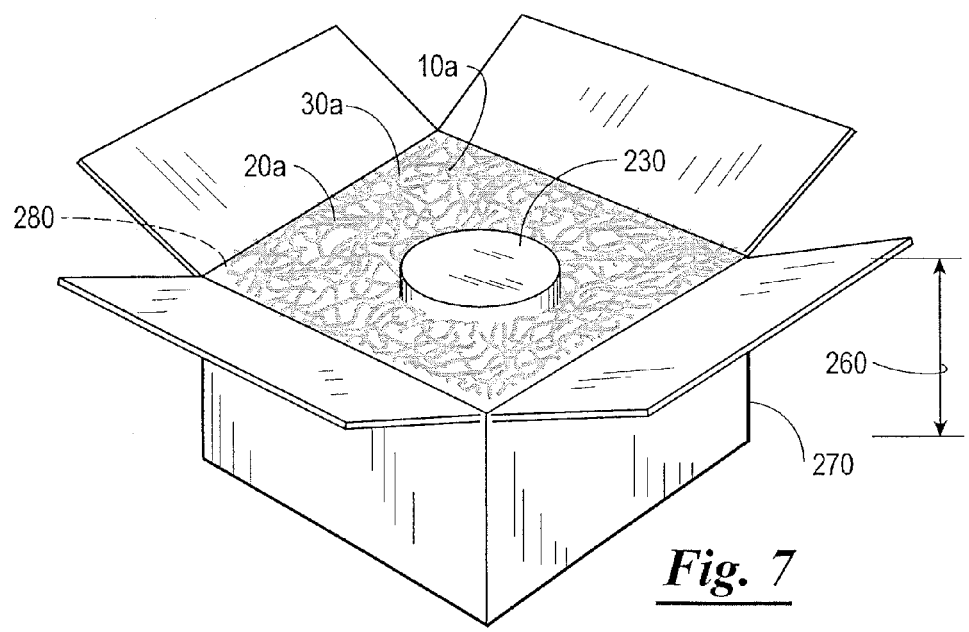
FIG. 7 is a perspective view of a package illustrating the inflatable packaging material of FIG. 6 disposed therein for cushioning an article during a shipping process.

For example, FIG. 7 illustrates the inflatable packaging material 10a disposed in a tall square container 270 so as to provide an interior 280 of the tall square container 270 with an inflatable packaging material 10a. The inflatable packaging material 10a is being used as a packaging material for protecting an article 230 disposed in the tall square container 270. In this manner, the tuft 20a of the inflatable packaging material 10a functions to cushion the plurality of articles or objects 230 during transport.

Figure 8:
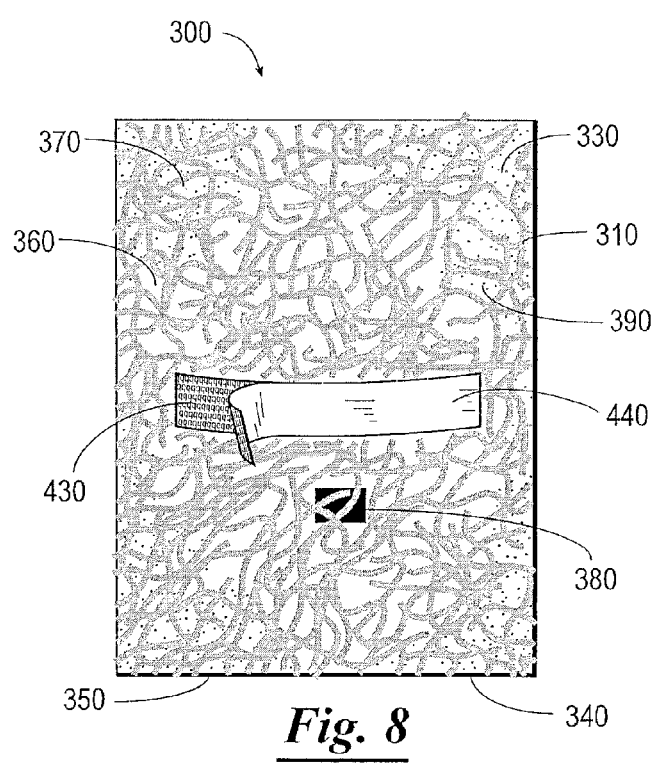
FIG. 8 is an elevational view of another embodiment of a packaging material constructed in accordance with the presently disclosed and claimed inventive concept(s).
Figure 9:
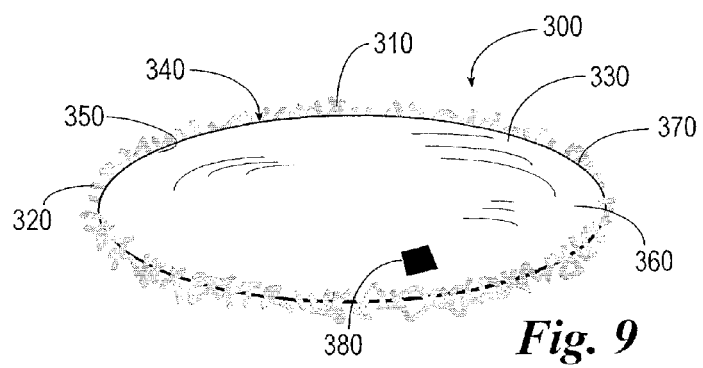
FIG. 9 is a perspective view of the inflatable packaging material of FIG. 8.

Referring now to FIGS. 8 and 9, an inflatable packaging material 300 constructed in accordance with the presently disclosed and claimed inventive concept(s) is illustrated. The inflatable packaging material 300 includes a tuft or mass 310 of individual, thin, flexible strips, strands or units of material 320, commonly referred to as decorative grass or Easter grass (although the tuft 310 may be fabricated from the same or similar material as tuft 20 disclosed hereinabove), disposed upon an exterior surface 330 of an flexible inflatable bag 340. It will be appreciated that tufts of decorative grass are often packaged loosely in a bag whereby when it is desired to utilize the decorative grass, the bag is opened and the grass removed. The inflatable packaging material 300 is unique in at least one respect in that the flexible inflatable bag 340 is used in conjunction with the tuft 310 on the exterior surface 330 in a manner similar to that described above in relation to the inflatable packaging material 10. That is, in addition to functioning as a substrate for the tuft 310, the flexible inflatable bag 340 is capable of being inflated while holding the tuft 310 to thereby clean up the problems associated with loose fill materials and provide a more economical and cushioning packaging material.

The structure of the flexible inflatable bag 340 can be that of any flexible inflatable bag suitable for being used in a packaging manner. For example, the flexible inflatable bag 340 can be fabricated from a sheet of material having a relatively small thickness and being of the type commonly referred to in the art as a "film". More particularly, the sheet of material can be a processed, man-made organic polymer film selected from the group of films consisting of polypropylene, polyvinyl chloride, or combinations thereof. However, it is to be noted that the sheet of material may also be constructed from a material selected from a group of materials consisting of plastic film, cellophane, paper, cloth, or combinations thereof. Alternatively, the flexible inflatable bag 340 may be of the type used typically to package sandwiches, such as a GLAD™ sandwich bag. The flexible inflatable bag 340 may also be a corsage bag, a balloon, a water storage bag, or any flexible bag or container that is capable of being inflated.

Figure 10:
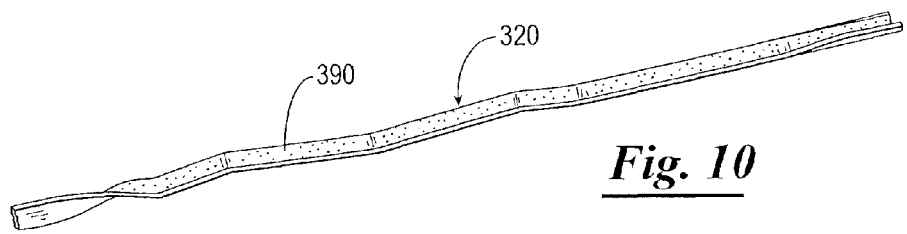
FIG. 10 is a perspective view of a strip, strand, or unit of material used to form a tuft of the inflatable packaging material of the presently disclosed and claimed inventive concept(s).

The flexible inflatable bag 340 is characterized as having the exterior surface 330 as well as an interior surface 350 with the interior surface 350 defining an expandable interior inflation space 360. As best shown in FIG. 8, the exterior surface 330 of the flexible inflatable bag 340 is coated with a bonding material 370, such as an adhesive or cohesive, whereby the tuft 310 is caused to bond to the exterior surface 330 of the flexible inflatable bag 340 upon being disposed on the flexible inflatable bag 340. The flexible inflatable bag 340 illustrated in FIG. 10 has the bonding material 370 disposed on substantially the entire exterior surface 330. Alternatively, the bonding material 370 may be applied in such a manner as to substantially coat only a portion of the exterior surface 330 of the flexible inflatable bag 340. It will be further appreciated that the bonding material 370 may be disposed on the exterior surface 330 of the flexible inflatable bag 340 in any of a variety of patterns such as strips, circles, dots or any other geometric or biomorphic shape, including decorative designs, so long as the bonding material 370 is positioned to function in accordance with the presently disclosed and claimed inventive concept(s). The tuft 310 is disposed on the flexible inflatable bag 340 in any manner which is known in the art, such as automatically passing the tuft 310 through a tube (not shown) which is disposed generally above the flexible inflatable bag 340, or the flexible inflatable bag 340 may be dipped, rolled, or dropped into a plurality of tufts 310 such that the tufts 310 stick to the exterior surface 330 of the flexible inflatable bag 340.

Upon the tuft 310 being placed onto the flexible inflatable bag 340, the tuft 310 will bondingly connect to the exterior surface 330 of the flexible inflatable bag 340 via the bonding material 370. After the tuft 310 has been disposed onto the flexible inflatable bag 340, the flexible inflatable bag 340 may be inflated via a means 380 for inflating the flexible inflatable bag 340 disposed in the expandable interior inflation space 360 to form the inflatable packaging material 300. The means 380 for inflating the flexible inflatable bag 340 is similar in construction to the means 110 for inflating the flexible inflatable substrate 40 of the inflatable packing material 10 as described hereinabove. It should be appreciated that with the tuft 310 disposed on the flexible inflatable bag 340, the flexible inflatable bag 340 can be stored, transported, and displayed in a conventional manner when it is in its inflated configuration or in its non-inflated configuration.

In addition to, or as an alternative to coating the exterior surface 330 of the flexible inflatable bag 340 with the bonding material 370, the tuft 310 may be connected to the exterior surface 330 of the flexible inflatable bag 340 via a bonding material 390 (FIG. 10) provided on the individual strips, strands, or units of material 320 making up the tuft 310. The bonding material 390 may be an adhesive or cohesive whereby the individual strips, strands, or units of material 320 are caused to stick together when a plurality of the strips, strands, or units of material 320 are amassed to form the tuft 310. The strips, strands, or units of material 320 may be spot coated wherein the bonding material 390 is disposed as randomly disposed spots on the individual strips, strands, or units of material 320. It will be appreciated, however, that the bonding material 390 may be applied in such a manner as to substantially cover the strips, strands, or units of material 320. Further, the bonding material 390 may be disposed on the strips, strands, or units of material 320 in any of a variety of other patterns such as circles, dots or any other geometric or biomorphic shape, including decorative designs, so long as the bonding material 390 is positioned to function in accordance with the presently disclosed and claimed inventive concept(s).

Figure 11:
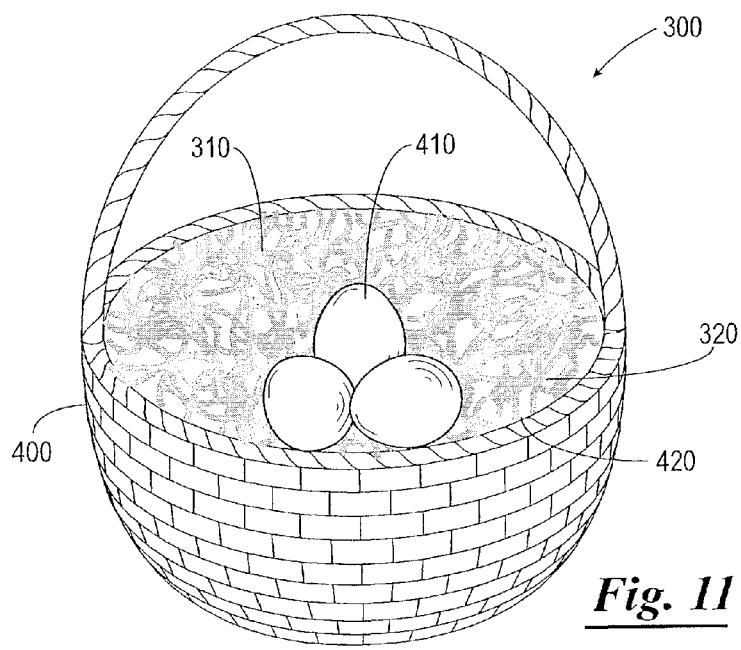
FIG. 11 is a perspective view of a basket showing the inflatable packaging material of FIG. 9 inserted therein and supporting and cushioning eggs.

FIG. 11 illustrates one use of the inflatable packaging material 300 described above. The inflatable packaging material 300 is shown disposed in a basket 400 and supporting a plurality of articles or objects 410, such as candies or Easter eggs, for display. More specifically, a portion of the flexible inflatable bag 340 has been removed so as to expose the tuft 310 while the tuft remains connected to the exterior surface 330 of the flexible inflatable bag 340.

With the flexible inflatable bag 340 inflatable, the inflatable packaging material 300 may then be positioned in an interior 420 of the basket 400 such that the flexible inflatable bag 340 substantially conforms to the contour of the interior 420 of the basket 400 and thereby lines the interior 420 of the basket 400 with the plurality of articles or objects 230 being supported by the tuft 310 and the tuft 310 being held in the basket 400.

It will be appreciated that coating the tuft 310 with a bonding material in the manner discussed above provides an additional advantage of improved object support. That is, with loose packaging materials, objects being packaged often have a tendency to gravitate through the packaging material to the bottom of the container thereby reducing the effectiveness of the packaging material. By providing a bonding material on the individual strips, strands, or units of material 320 making up the tuft 310, the cohesiveness of the tuft 310 supporting the plurality of articles or objects 410 prevent the plurality of articles or objects 410 from gravitating through the tuft 310.

As shown in FIG. 8, the exterior surface 330 of the flexible inflatable bag 340 may also be provided with a bonding material 430. In this instance, the bonding material 430 would be provided with a backing or release strip 440 to protect the bonding qualities of the bonding material 430 and to prevent adjacent bags from bonding to one another during shipping and storage. By providing the exterior surface 330 of the flexible inflatable bag 340 with the bonding material 430 (as shown in FIG. 8), the exterior surface 330 of the flexible inflatable bag 340 can be bondably connected to an interior 420 of the basket 400 to hold the inflatable packaging material 300 in the basket 400. In addition, the bonding material 430 on the exterior surface 330 of the flexible inflatable bag 340 will cause overlapping portions of the flexible inflatable bag 340 to be bondably connected so as to retain the shape of the flexible inflatable bag 340 after it has been shaped to conform to the contour of the interior 240 of the basket 400. If the exterior surface 330 of the flexible inflatable bag 340 is not provided with the bonding material 430, the flexible inflatable bag 340 is simply shaped to conform to the contour of the interior 420 of the basket 400.

In using the inflatable packaging material 300 described above, it should be appreciated that a single unit of the inflatable packaging material 300 can be used in a container or on a surface or multiple units of the inflatable packaging material 300 can be used by either nesting one inflatable packaging material 300 into another inflatable packaging material 300 or otherwise layering one inflatable packaging material 300 on top of another inflatable packaging material 300, thereby increasing the volume and/or density of the inflatable packaging material 300.

Figure 12:
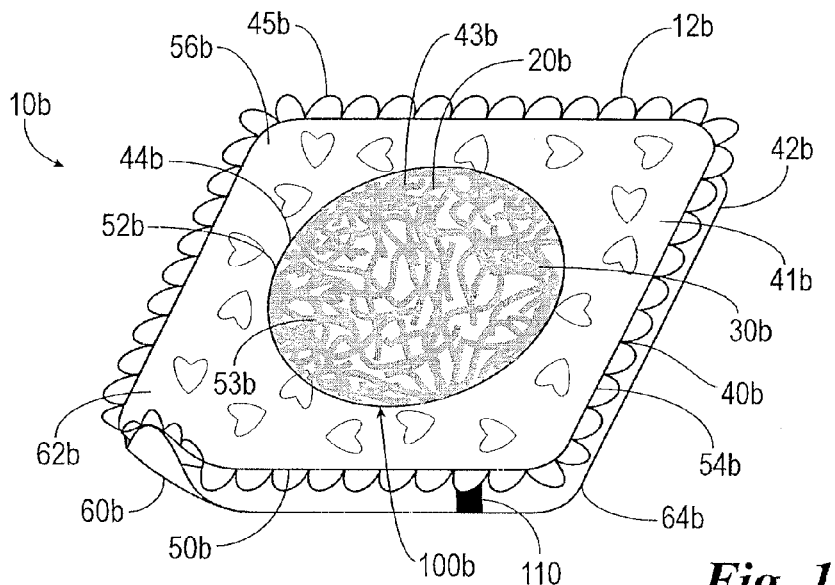
FIG. 12 is a perspective view of another embodiment of an inflatable packaging material constructed in accordance with the presently disclosed and claimed inventive concept(s).
Figure 13:
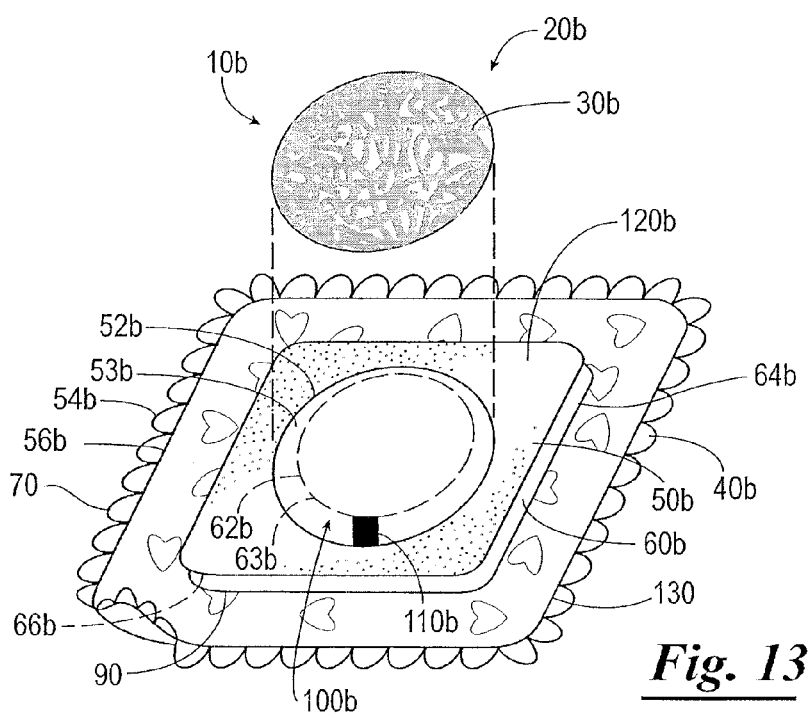
FIG. 13 is an exploded view of the inflatable packaging material of FIG. 12.
Figure 14:
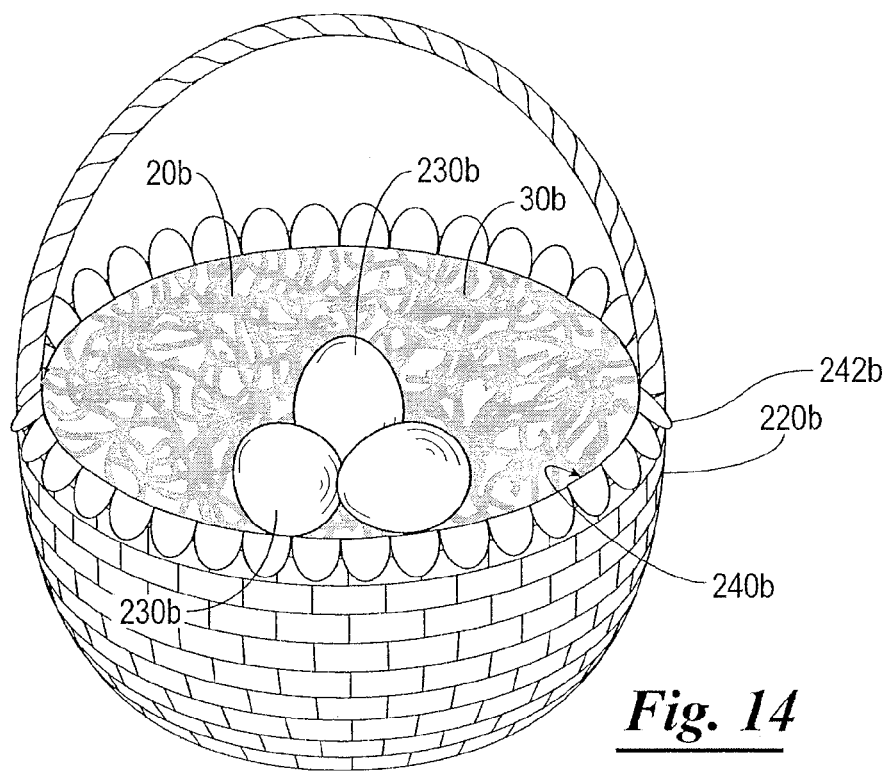
FIG. 14 is a perspective view of a basket having the inflatable packaging material of FIG. 12 disposed therein with a plurality of eggs displayed or cushioned thereon.

Referring to FIGS. 12-14, shown therein is an inflatable packaging material 10b constructed in accordance with the presently disclosed and claimed inventive concept(s). The inflatable packaging material 10b is similar in construction to the inflatable packaging material 10. The inflatable packaging material 10b includes a flexible inflatable substrate 40b, a decorative extension 12b and the tuft 20b. The tuft 20b is similar to the tuft 20a. The tuft 20b is connected to the flexible inflatable substrate 40b in a manner similar to the manner in which the tuft 20 is connected to the flexible inflatable substrate 40. The tuft 20b includes the plurality of individual strips, strands, or units of material 30b similar to the plurality of individual strips, strands or units of material 30 and can be, for instance, bondably connected to the flexible inflatable substrate 40b. The flexible inflatable substrate 40b includes an exterior surface 41b, and interior surface 42b, an inner area 43b substantially surrounded by an inner seal 44b and a distal edge 45b. In one embodiment the decorative extension 12b extends outwardly from at least a portion of the inner seal 44b to at least a portion of the distal edge 45b.

The flexible inflatable substrate 40b is fabricated of a first sheet of material 50b and a second sheet of material 60b similar in construction to the first sheet of material 50 and the second sheet of material 60, respectively. It will be appreciated that the dimensions of the flexible inflatable substrate 40*b* may be varied and the shape of the flexible inflatable substrate 40*b* may be variable—e.g., a circle, square, triangle, heart, an animal shape, a floral shape, etc. The first sheet of material 50*b* and the second sheet of material 60*b* can be any flexible sheet of material, such as paper, wax paper, polymeric film, laminated polymeric film, fabric, cellulose, and foil. The first sheet of material 50*b* and the second sheet of material 60*b* may have printing and embossing on all or a part of at least one side thereof, and the embossing can be either in register or out of register with the printing. Different colors can be employed to provide the printing on the first sheet of material 50*b* and the second sheet of material 60*b*. For example, the printing may be a pictorial representation, or color, or shape of the plurality of individual strips, strands, or units of material 30*b* such that when a small amount of the plurality of individual strips, strands, or units of material 30, forming the tuft 20*b* are bonded to the flexible inflatable substrate 40*b*, the printing fills in the voids between the plurality of individual strips, strands, or units of material 30*b*. The printing provides the illusion that there are few or no actual voids of the plurality of individual strips, strands, or units of material 30*b* on the flexible inflatable substrate 40*b* thereby resulting in an aesthetically pleasing inflatable packaging material 10*b* that appears to be fully covered with the individual strips, strands, or units of material 30*b*.

The first sheet of material 50*b* and the second sheet of material 60*b* of the flexible inflatable substrate 40*b* may be constructed of a single layer of material or a plurality of layers of the same or different types of materials. In addition, any thickness of the first sheet of material 50*b* and the second sheet of material 60*b* may be utilized with the presently disclosed and claimed inventive concept(s). The first sheet of material 50*b* has an inner perimeter 52*b*, an inner area 53*b* surrounded by the inner perimeter 52*b*, an outer peripheral edge 54*b* and an outer area 56*b* between the inner perimeter 52*b* and the outer peripheral edge 54*b*.

The second sheet of material 60*b* has an inner perimeter 62*b*, an inner area 63*b* surrounded by the inner perimeter 62*b* substantially sized and shaped to mate with the inner perimeter 52*b* and inner area 53*b*, respectively, of the first sheet of material 50*b* such that as the first sheet of material 50*b* and the second sheet of material 60*b* are disposed in a coplanar, parallel and aligned configuration the sealing of the inner perimeter 52*b* of the first sheet of material 50*b* to the inner perimeter 62*b* of the second sheet of material 60*b* provides the inner seal 44*b* for the flexible inflatable substrate 40*b*. In one embodiment the second sheet of material 60*b* also has an outer peripheral edge 64*b* and an outer area 66*b* between the inner perimeter 62*b* and outer peripheral edge 64*b*. The outer area 56*b* of the first sheet of material 50*b* can be bonded to the outer area 66*b* of the second sheet of material 60*b* to provide the decorative extension 12*b* for the inflatable packaging material 10*b* and the outer peripheral edge 54*b* of the first sheet of material 50*b* and the outer peripheral edge 64*b* of the second sheet of material 60*b* provides the distal edge 45*b* for the flexible inflatable substrate 40*b*. The inner perimeter 52*b* of the first sheet of material 50*b* can be sealed via bonding or welding the inner perimeter 66*b* of the second sheet of material 60*b* to provide and define an expandable interior inflation space 100*b*. A means 110*b* for inflating similar in construction to the means 110 for inflating, previously described herein, is disposed within the expandable interior inflation space 100*b*. The flexible inflatable substrate 40*b* is inflated by the means 110*b* for inflation.

Although the flexible inflatable substrate 40*b* is shown in FIGS. 12-14 as having the inner area 43*b* being substantially round and the distal edge 45*b* being scalloped, the inner area 43*b* and the distal edge 45*b* of the flexible inflatable substrate 40*b* may be any shape. For example, the inner area 43*b* and/or the distal edge of the flexible inflatable substrate 45*b* may be square, rectangular, oval, oblong, triangular, hexagonal or any other geometric or fanciful shape. The distal edge 45*b* of the flexible inflatable substrate 40*b* may also be any shape or even have an irregular, capricious or decorative shape. The tuft 20*b* is attached to the exterior surface 120*b* of the flexible inflatable substrate 40*b* in substantially the same way as the tuft 20 is attached to the flexible inflatable substrate 40. The tuft 20*b* can be sized and configured to cover all or only a portion of the exterior surface 120*b* of the flexible inflatable substrate 40*b*. The tuft 20*b* can also be sized, configured and disposed to cover all or a portion of the decorative extension 12*b*.

FIG. 14 illustrates one use of the inflatable packaging material 10*b* described above. The inflatable packaging material 10*b* is shown in its inflated condition after the means 110*b* for inflating has been activated (i.e., the expandable interior inflation space 100*b* is inflated) and is disposed in a basket 220*b* to support a plurality of articles or objects 230*b*, such as candies or Easter eggs, for display. More specifically, the inflatable packaging material 10*b* is positioned in an interior 240*b* of the basket 220*b* such that the inner area 43*b* of the flexible inflatable substrate 40*b* substantially conforms to the contour of the interior 240*b* of the basket 220*b* thereby lining the interior 240*b* of the basket 220*b* with the individual strips, strands, or units of material 30*b* forming the tuft 20*b* that is bonded to the flexible inflatable substrate 40*b* to form the inflatable packaging material 10*b* and the decorative extension 12*b* extends generally above an upper edge 242*b* of the basket 220*b*. If the second sheet of material 60*b* of the flexible inflatable substrate 40*b* is provided with the bonding material 22*b*, the second sheet of material 60*b* of the flexible inflatable substrate 40*b* can be bondably connected to the interior 240*b* of the basket 220*b*. In addition, the bonding material 22*b* on the second sheet of material 60*b* of the flexible inflatable substrate 40*b* causes the inflatable packaging material 10*b* to remain in place in the basket 220*b*. If the second sheet of material 60*b* of the flexible inflatable substrate 40*b* is not provided with the bonding material 22*b*, the flexible inflatable substrate 40*b* simply rests in the interior 240*b* of the basket 220*b*.

Figure 15:
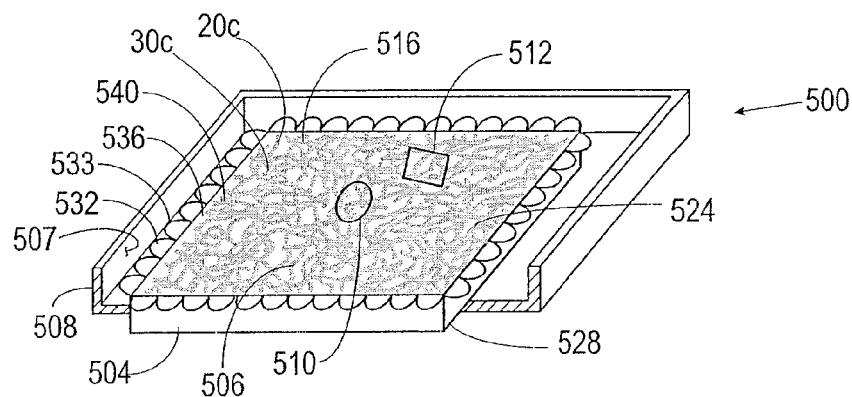
FIG. 15 is a cut away view of a container having a packaging material constructed in accordance with the presently disclosed and claimed inventive concept(s) disposed therein.

Referring now to FIG. 15 shown therein is a packaging material 500 constructed in accordance with the presently disclosed and claimed inventive concept(s). The packaging material 500 includes a substratum 504 and a printed pattern 506 simulating a grass-like pattern disposed on at least a portion of the substratum 504 so as to provide the substratum with a grass-like appearance. Although the substratum 504 is shown in FIG. 15 as rectangular, the substratum 504 may be any shape. For example, the substratum 504 may be square, triangular, hexagonal, circular or any other geometric shape. The substratum 504 may even have an irregular or non-linear, capricious or decorative shape.

The substratum 504 can be constructed of any non-inflatable cushioning and/or resilient type of material capable of supporting and cushioning an object such as sponge-like material such as, by way of example but not limitation, natural sponge, artificial sponge, polymeric material, cloth, paper, cardboard, cellulose, papier-mâché or combinations, derivations and laminations thereof. The substratum 504 may be constructed of a single layer of material or a plurality of layers of the same or different types of material. In addition, any thickness of substratum 504 may be utilized in the presently disclosed and claimed inventive concept(s). Preferably, the substratum 504 is substantially conformable to the general contour of an interior surface 507 of a container 508 and the substratum 504 is capable of supporting and cushioning an object 510 disposed on the substratum 504. A plurality of the substratum 504 may be disposed in the container 508. The plurality of the substratum 504 is preferably substantially conformable to the general contour of the interior surface 507 of the container 508 and capable of cushioning the object 510 supported by the plurality of the substratum 504.

The substratum 504 can also be embossed so as to provide the substratum 504 with an embossed pattern 512. The embossed pattern 512 can be either in register or out of register with the printed pattern 506. The embossing can cover all or only a portion of the substratum 504.

Different colors can be employed to provide the printed pattern 506 on the substratum 504. The printed pattern 506 can be disposed on the entire exterior surface 516 of the substratum 504 or the printed pattern 506 can be disposed on only a portion of the substratum 504.

A bonding material 520 may be applied to all or at least a portion of the substratum 504. The term "bonding material" as used herein can mean an adhesive, frequently a pressure sensitive adhesive, or a cohesive or any adhesive/cohesive combination having adhesive qualities (i.e., qualities of adhesion or adhesion/cohesion, respectively) sufficient to affect the connection between portions of the substratum 504 and portions of the container 508 and/or an object supported by the substratum 504 brought into engagement with the substratum 504. It will be appreciated that both adhesives and cohesives, for the purposes described herein, are well-known in the art, and commercially available.

The bonding material 520 may be applied in such a manner so as to substantially coat only a first surface 524 or only a second surface 528 of the substratum 504. It will further be appreciated that the bonding material 520 may be disposed on the first surface 524 and/or the second surface 528 in any variety of patterns such as strips, circles, dots, or any other geometric or biomorphic shape, including decorative designs so long as the bonding material 520 is positioned to function in accordance with the presently disclosed and claimed inventive concept(s).

The printed pattern 506 may be any printed pattern or any pictorial representational color or shape, such as a printed pattern simulating the grass-like appearance of the tuft 20c such that when a small amount of the plurality of individual strips strands, or units of material 30c forming a tuft 20c are bonded to the substratum 504, the printed pattern 506 fills voids between the plurality of individual strips, strands or units of material 30c such that it provides the illusion that there are few or no actual voids of the plurality of individual strips, strands or units of material 30c on the substratum 504 thereby resulting in an aesthetically pleasing packaging material 500 that appears to be fully covered with the individual strips, strands, or units of material 30c.

The packaging material 500 can also include at least one decorative extension 532 that extends outwardly from at least a portion of the substratum 504. The decorative extension 532 can be fabricated from any sheet of material including but not limited to paper, crepe paper, polymeric film, laminated polymeric film, cardboard, papier-mâché, cloth or combinations, laminations, and derivations thereof. The decorative extension 532 can include an interior expandable space 533 and a means for inflating the interior expandable space 533 so as to allow the decorative border 532 to be inflatable. The decorative extension 532 can include printing 536 disposed on at least a portion of the decorative extension 532. The decorative extension 532 can also include embossing 540. Printing 536 and embossing 540 on the decorative extension 532 can be in register or out of register. Different colors can be employed to provide the printing 536 on the decorative extension 532. The decorative extension 532 can extend entirely around substratum 504 or the decorative extension 532 can extend only around a portion of the substratum 504. Although the shape of the decorative extension 532 is shown as substantially scalloped the shape of the decorative extension 532 can be any geometric, or non-geometric, or linear, or non-linear decorative or even fanciful shape. All or a portion of the decorative extension 532 can be bonded to the substratum 504 or frictionally secured to the substratum 504. Furthermore, the decorative extension 532 can be secured to the substratum 504 via securing elements such as by way of example but not limitation rubber bands, elastic bands, clips, thread, twine, string, cloth or staples or combinations and derivations thereof. The decorative extension 532 can be sized, shaped, and configured such that the decorative extension 532 extends above the container 508 into which the substratum 504 and the decorative extension 532 are disposed or the decorative extension 532 can be sized, shaped and configured such that the decorative extension 532 is even with or below the container 508 into which the substratum 504 and the decorative extension 532 are disposed. The decorative extension 532 can include a means for conveniently removing the decorative extension 532 from the substratum 504 via a detaching element such as a tear strip, score line or a plurality of perforations.

Figure 16:
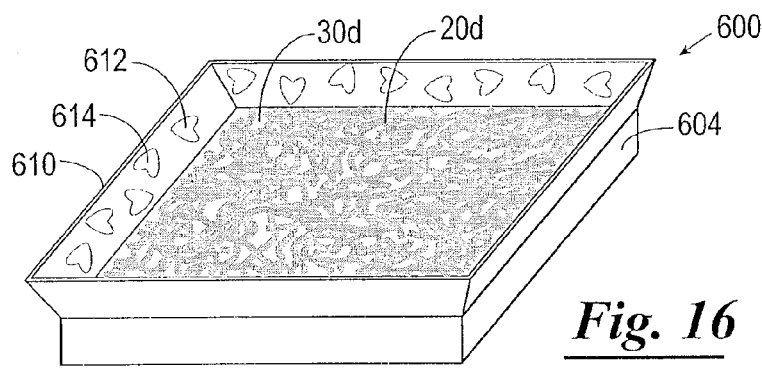
FIG. 16 is a perspective view of another embodiment of a packaging material constructed in accordance with the presently disclosed and claimed inventive concept(s).

Referring now to FIG. 16 shown therein is packaging material 600 similar to the packaging material 500. The packaging material 600 includes a substratum 604 similar to the substratum 504, except the substratum 604 does not include the printing 508. The packaging material 600 does include individual strips, strands or units of material 30d disposed on the substratum 604. The individual strips, strands or units of material 30d can be bondably connected to the substratum 604. The packaging material 600 can also include at least one decorative extension 610, similar to the decorative extension 532, bonded to the substratum 604 or frictionally connected to the substratum 604 or secured to the substratum 604 via the securing elements such as elastic bands, rubber bands, strips of cloth, staples, twine, or string or otherwise at least partially secured or associated with the substratum 604. The decorative extension 610 can include a printed pattern 612 similar to the printed pattern 536 and embossing 614 similar to the embossing 540.

The individual strips, strands or units of material 30d can be intertwined to form a cohesive mass of strips, strands and units of material 20d for connection to or disposition on the substratum 604 or the individual strips, strands and units of material 30d can include a bonding material disposed on at least a portion of the mass of individual strips, strands and units of material to form a cohesive mass of strips, strands and units of material connected to the substratum 604. Furthermore, the individual strips, strands or units of material 30d can be both intertwined and include the bonding material to form a cohesive mass of strips, strands and units of material 20d connected to the substratum 604.

Figure 17:
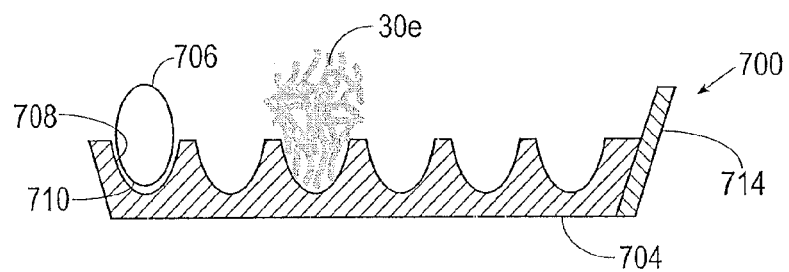
FIG. 17 is a cross-sectional view of the packaging material of FIG. 16 having a plurality of eggs displayed thereon.

Referring now to FIG. 17 shown therein is a packaging material 700 similar to the packaging material 500 and the packaging material 600. The packaging material 700 includes a substratum 704 adapted to support and/or cushion at least one object 706. The substratum 704 includes at least one depression 708 sized and configured to receive at least a portion 710 of the object 706. The packaging material 700 can also include a decorative extension 714 similar to the decorative extension 532 and the decorative extension 632. The decorative extension 714 can include printing and embossing similar to the printing and embossing on the decorative extensions 532 and 632 of packaging material 500 and packaging material 600, respectively. The packaging material 700 also includes the mass of individual strips, strands or units of material 30e connected to the substratum 704. In one embodiment of the packaging material 700, the at least one depression 708 is substantially semi-elliptically configured, sized and shaped to receive at least a portion of at least one substantially egg-shaped object 706.

Figure 18:
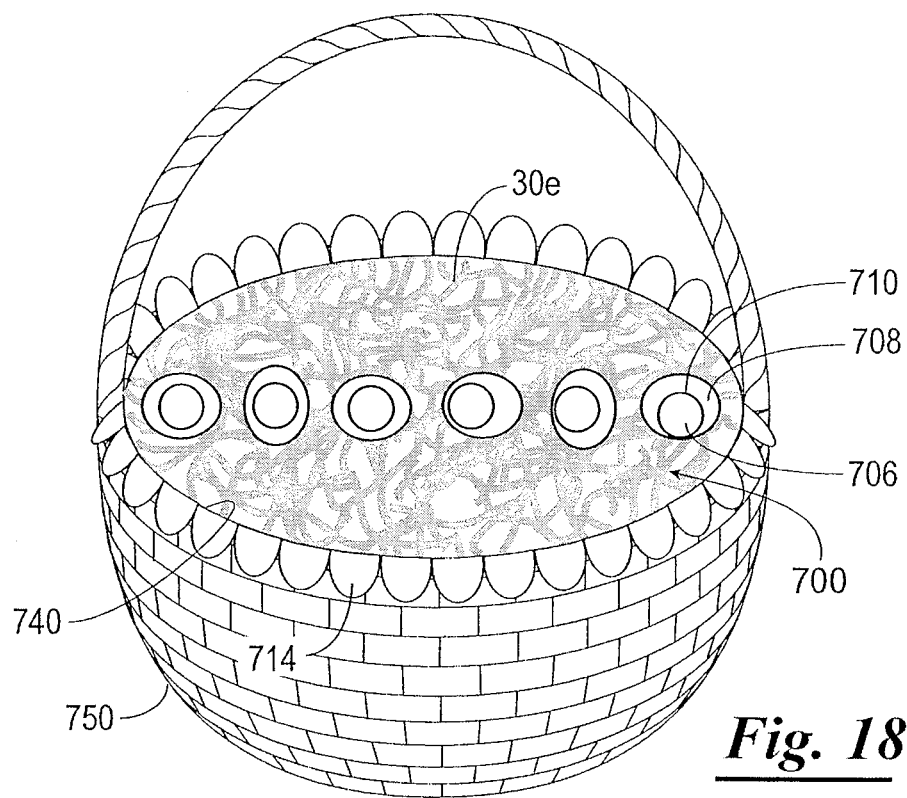
FIG. 18 is a perspective view of a basket having the packaging material of FIG. 17 disposed therein with a plurality of eggs cushioned or displayed thereon.

FIG. 18 illustrates one use of the packaging material 700. The packaging material 700 is positioned in an interior 740 of a basket 750 such that the substratum 704 substantially conforms to the general contour of the interior 740 of the basket 750 thereby lining the interior 740 of the basket 750 and providing the at least one depression 708 in the substratum 704 sized and configured to receive at least a portion 710 of at least one substantially egg shaped object 706 disposed in the depression 708 of the substratum 704. Surrounding the substantially egg-shaped object 706 disposed in the depression 708 of the substratum 704 is the mass of individual strips, strands or units of material 30e so as to provide a pleasing and decorative appearance. The decorative extension 714 extends outwardly from the substratum 704 to add to the overall decorative effect. The individual strips, strands or units of material 30e can be constructed of at least one clear layer of polymeric film laminated to at least one layer of iridescent polymeric film so as to provide an iridescent effect to the packaging material 700. The packaging material 700 can be secured to the basket 750 via bonding material or securing elements or the packaging material 700 can be secured to the basket 750 via a combination of bonding materials, securing elements and/or frictionally secured.

From the above description it is clear that the presently disclosed and claimed inventive concept(s) is well adapted to carry out the objects and to attain the advantages mentioned herein as well as those inherent in the presently disclosed and claimed inventive concept(s). While presently preferred embodiments of the inventive concept(s) have been described for purposes of this disclosure, it will be understood that numerous changes may be made which will readily suggest themselves to those skilled in the art and which are accomplished within the spirit of the inventive concept(s) disclosed and as defined in the appended claims.

What is claimed:
1. A package, comprising:
a container having an interior;
a packaging material disposed within the interior of the container, the packaging material comprising a substratum adapted to support and cushion an object, wherein the substratum is a flexible inflatable substrate having an exterior surface and an interior surface, wherein the interior surface defines an expandable interior inflation space, the packaging material further comprising:
(a) at least one strip, strand, or unit of material disposed on a surface of the substratum and within the interior of the container; and/or
(b) a printed pattern disposed on at least a portion of the substratum, the printed pattern comprising a plurality of individual strips, strands, or units of material, thereby providing the substratum with a grass-like appearance; and
at least one object disposed on the packaging material and within the interior of the container, whereby the packaging material supports and cushions the object within the interior of the container.

2. The package of claim 1, wherein the packaging material further includes an inflation assembly for inflating the flexible inflatable substrate, and wherein at least one of:
(a) the inflation assembly is disposed in the expandable interior inflation space of the flexible inflatable substrate;
(b) the inflation assembly is associated with the exterior surface of the flexible substrate and is in fluid communication with the expandable interior inflation space of the flexible inflatable substrate; and
(c) the inflation assembly includes an exothermic reaction assembly, wherein when the exothermic reaction assembly is activated, an exothermic reaction takes place thereby producing a gas capable of filling at least a portion of the expandable interior inflation space of the flexible substrate.

3. The package of claim 1, wherein the exterior surface of the flexible inflatable substrate of the packaging material includes a decorative effect.

4. The package of claim 1, wherein the container is a basket.

5. The package of claim 1, wherein the at least one object comprises at least one candy and/or Easter egg.

6. The package of claim 1, wherein the packaging material is bondingly connected to the interior of the container.

7. The package of claim 1, wherein the object is bondingly connected to the packaging material.

8. The package of claim 1, wherein (a) is further defined as a plurality of strands of decorative grass.

9. The package of claim 1, wherein the packaging material substantially conforms to a contour of the interior of the container and thereby lines the interior of the container with the at least one object being supported by the packaging material held within the interior of the container.

10. The packaging material of claim 1, wherein the substratum is constructed of sponge-like material.

11. The packaging material of claim 1, further comprising at least one depression formed in the substratum, wherein the at least one depression is substantially elliptically configured and sized to receive at least a portion of at least one substantially egg-shaped object.

12. The package of claim 1, wherein the packaging material further includes a decorative extension extending outwardly from at least a portion of the substratum.

13. The package of claim 12, wherein the decorative extension includes embossing on at least a portion of the decorative extension.

14. The package of claim 12, further comprising a printed pattern simulating the appearance of decorative grass disposed on at least a portion of the decorative extension.

* * * * *

UNITED STATES PATENT AND TRADEMARK OFFICE
CERTIFICATE OF CORRECTION

| | | |
|---|---|---|
| PATENT NO. | : 8,968,847 B2 | Page 1 of 1 |
| APPLICATION NO. | : 14/134719 | |
| DATED | : March 3, 2015 | |
| INVENTOR(S) | : Donald E. Weder | |

It is certified that error appears in the above-identified patent and that said Letters Patent is hereby corrected as shown below:

On the Title Page:
Under (71) Applicant: After "Family Trust," insert -- U/T/A dated 12/8/1995 --

Signed and Sealed this
Twenty-seventh Day of October, 2015

Michelle K. Lee
*Director of the United States Patent and Trademark Office*